United States Patent Office 3,654,198
Patented Apr. 4, 1972

3,654,198
NON-CRATERING FUSIBLE POLYESTER-CELLU-LOSE ESTER COATING COMPOSITION
James D. Hood and James G. Stranch, Kingsport, Tenn., assignors to Eastman Kodak Company, Rochester, N.Y.
No Drawing. Filed June 29, 1970, Ser. No. 50,928
Int. Cl. C08b 21/08; C03c 17/28; C08g 51/36
U.S. Cl. 260—16
22 Claims

ABSTRACT OF THE DISCLOSURE

A polyester coating composition including a linear polyester such as poly(1,4-cyclohexanedimethylene-50 mole percent terephthalate-50 mole percent isophthalate), cellulose acetate butyrate, and optionally a plasticizer such as di-2-ethylhexyl phthalate, a stabilizer such as dilauryl 3,3′-thiodipropionate, dyes and/or pigments, a linear bisphenolic polyester. The coating can be applied to a heatable substrate in powder form and caused to fuse by application of heat in the range of 375° F. to 500° F. producing a smooth, non-cratered surface.

---

This invention relates to polyester coating compositions and more particularly to polyester coating compositions which can be deposited in finely divided or powdered form on heatable substrates and thereafter coalesced to form smooth, strongly adherent, continuous and uncratered coatings on such substrates.

As is known to those skilled in the art, the coating of a wide variety of articles of commerce such as refrigerators, washing machines, kitchen utensils, steel plates, wall panels and the like has been accomplished by brushing or spraying the surface of such articles with a solution of the coating material followed by evaporation of the solvent component. Over the years other coating techniques have been developed, one of which is to deposit the coating material on the surface of the article in the form of a heat-fusible powder which may contain, in addition to the primary protective material, any desired additives such as plasticizers, pigments and the like, after which the material is fused into a continuous coating under the influence of heat. Heat-fusible polyesters are useful as the coating or protective component of such powders but they have been found to be unsuitable in many applications because of a tendency to form "cratered" and therefore uneven coatings of undesirable appearance. As will be more fully set forth hereinafter, according to the present invention heat-fusible polyesters applied by the powder-coating and fusion technique can be employed to produce smooth, uncratered, fused coatings on a wide variety of heatable substrates.

Accordingly, an object of this invention is to provide an improved type of heat-fusible polyester coating composition which can be applied to metal, glass, ceramic, thermosetting plastic and other heatable substrates to produce thereon smooth, uncratered, protective coatings.

This invention relates to polyester coating compositions and more particularly to polyester coating compositions which can be deposited in finely divided or powdered form on heatable substrates and thereafter coalesced to form smooth, strongly adherent, continuous and un-cratered coatings on such substrates.

As is known to those skilled in the art, the coating of a wide variety of articles of commerce such as refrigerators, washing machines, kitchen utensils, steel plates, wall panels and the like has been accomplished by brushing or spraying the surface of such articles with a solution of the coating material followed by evaporation of the solvent component. Over the years other coating techniques have been developed, one of which is to deposit the coating material on the surface of the article in the form of a heat-fusible powder which may contain, in addition to the primary protective material, any desired additives such as plasticizers, pigments and the like, after which the material is fused into a continuous coating under the influence of heat. Heat-fusible polyesters are useful as the coating or protective component of such powders but they have been found to be unsuitable in many applications because of a tendency to form "createred" and therefore uneven coatings of undesirable appearance. As will be more fully set forth hereinafter, according to the present invention heat-fusible polyesters applied by the powder-coating and fusion technique can be employed to produce smooth, uncratered, fused coatings on a wide variety of heatable substrates.

Accordingly, an object of this invention is to provide an improved type of heat-fusible polyester coating composition which can be applied to metal, glass, ceramic, thermosetting plastic and other heatable substrates to produce thereon smooth, uncratered, protective coatings.

A further object is to provide heat-fusible polyester coating compositions in the form of finely divided powders which can be deposited on metal, glass, ceramic, thermosetting plastic and other heatable substrates by standard deposition method sand then fused by application of heat to form smooth, strongly adherent and un-cratered surface coatings.

A still further object is to provide heat-fusible polyester coating compositions of the type referred to in the preceeding paragraph which are fusible into smooth, continuous, strongly adherent and uncratered surface coatings at temperatures normally employed in powder deposition and fusion processes.

Another object is to provide heat-fusible polyester coating compositions of the type referred to above which, after deposition on the surface of a heatable substrate and fusion thereon, will give coatings characterized by high adherence to the substrate, toughness, flexibility, impact strength, and resistance to the lowering of adherence by the action of water when the coated substrates are in contact with water.

Another object is to provide heat-fusible polyester coating compositions stabilized against adverse color changes when such powdered compositions are subjected to the fusion temperatures normally employed in powder deposition and fusion processes.

Other objects will appear hereinafter.

These objects are accomplished according to the invention by depositing on a heatable substrate a powdered polyester composition which can be fused into a smooth, continuous, uncratered coating by application of heat. As will be more fully set forth hereinafter and illustrated by the examples which follow, such compositions are based on a multi-component system, the principal component of which is a linear polyester, the preparation, composition and characteristics of which are set forth in U.S. Pat. 2,901,466, the disclosure of which is incorporated herein by reference.

Inherent viscosities of linear polyesters are determined herein at 25° C. in 60/40 parts by weight of phenol/tetrachloroethane at a concentration of 0.25 grams/100 milliliters.

According to one aspect of our invention there is provided a heat-fusible powdered composition comprising components (1) and (2) as follows:

(1) From about 72 to about 98 parts by weight, based on said composition, of a linear polyester having an inherent viscosity of at least about 0.4 essentially derived from constituents:

(a) a dibasic dicarboxylic acid comprising 45–55 mole percent terephthalic acid and 55–45 mole percent isophthalic acid, or polyester-forming derivatives thereof, and (b) a glycol comprising at least 75 mole percent 1,4-cyclohexanedimethanol or polyester-forming derivatives thereof, (2) From about 2 to about 28 parts by weight of said composition of a cellulose ester wherein the cellulose ester contains acetate and butyrate groups, said cellulose ester having a butyryl content of at least 15 percent by weight of said cellulose ester, an acetyl content of from about 0.5 to about 34 percent by weight of said cellulose ester, a hydroxy content of from about 0.1 percent to about 5 percent by weight of said cellulose ester and a viscosity of from about 0.1 to about 30 as determined by ASTM Procedure Designation D–817.

According to a further aspect of our invention there is provided a composition as described above which comprises components (1) and (2) and also (3) from about 2 to about 20 parts by weight, based on said composition, of a plasticizing ester of an organic acid and an alcohol having plasticizing properties in conjunction with said cellulose ester and said polyester.

While compositions composed of components (1) and (2) can be successfully employed as heat-fusible powdered coating compositions for coating various heatable substrates, in accordance with another aspect of our invention, it is preferable to employ this third or plasticizing component (3), which functions to lower the fusion temperature of the composition as a whole and thus to provide for ready flowability of the material within acceptable temperature ranges such as 375° F. to 500° F. Such a plasticizer should of course be compatible with components (1) and (2) or the composition. Illustrative of suitable plasticizers are, for example, di-2-ethylhexyl phthalate prepared by reacting phthalic acid with di-2-ethylhexyl alcohol, di(2-ethylhexyl) isophthalate, di(2-ethylhexyl) azelate, didecyl phthalate, dibutyl phthalate, triphenyl phosphate, tricresyl phthalate, dibutyl sebacate, dioctyl adipate, and butybenzyl phthalate.

According to still another aspect of our invention there is provided a composition comprising components (1), (2), and optionally (3), and also (4) from about 0 to about 30 parts by weight of a pigment, a dye or a combination thereof, to give the composition any desired color and hiding or covering power.

According to a still further aspect of our invention there is provided a composition comprising components (1), (2), optionally (3) and/or (4), and also (5) from about 1 to about 10 parts by weight of a linear bisphenolic polyester having an inherent viscosity of from about 0.1 to about 0.3, prepared by condensing bisphenol A-diacetic with dicarboxylic acid comprising from 20 to 100 mole percent isophthalic acid and 0 to 80 mole percent terephthalic acid. More specifically component (5) is prepared from:

(a) a dicarboxylic acid comprising 55–75 mole percent terephthalic acid and 25–45 mole percent isophthalic acid or ester-forming derivatives thereof, and (b) 45 to 25 mole percent 4,4'-isopropylidenediphenol.

Addition of component (5) to the other components of the composition results in a coating material having unusual and wholly unexpected high substrate adherence, toughness, flexibility, and impact strength.

As indicated above, it is wholly unexpected to discover that addition of the polyester derived from bisphenol A-diacetate to components (1), (2), optionally (3) and (4) would contribute increased adherence, flexibility, toughness, impact strength, to a fused coating produced from the composition. It had previously been observed that coatings consisting only or primarily of a polyester condensation product derived from bisphenol A-diacetate are extremely brittle, tend to flake off and are, therefore, when used alone, wholly unsuitable for effective or desirable coating applications.

According to another aspect of our invention there is provided a composition comprising (1), (2), optionally (3) and/or (4) and/or (5) and also component (6), which is about 0 to about 1 percent by weight based on the weight of polyester component (1) of a polyester stabilizer, which functions to prevent degradation of the polyester and thereby prevent darkening or other adverse color change of the composition as a whole. The stabilizer compound dilauryl 3,3'-thiodipropionate has been found to be satisfactory. The employment of the stabilizer thus provides a means of obtaining color uniformity in coatings produced from our novel compositions under widely varying fusion temperatures.

Reference will now be made to typical procedural steps by which a powdered, non-cratering, heat-fusible polyester containing composition may be prepared in accordance with our invention. The composition will always contain components (1) and (2) in weight percentages falling within the ranges indicated above and may optionally and preferably contain predetermined and selected weight percentages of compoents (3), (4), (5) and (6) falling within the ranges of these components indicated above. The selected components are then homogenized on a two-roll hot mill, from which the homogenized material emerges in sheet form, is solidified by cooling, and cut into cubical pellets of approximate ⅛-inch size. These pellets are then pulverized in a grinder to a powder having an average particle size ranging from about 30 to about 200 microns.

Powdered compositions prepared as described above may be employed in accordance with our invention to produce fused coatings on the surfaces of any "heatable" substrate. By the term heatable substrate we refer to any substrate material which can withstand a temperature within the range of about 375° F. to about 500° F. without deforming, charring and the like. Examples of such heatable substrates are those composed of steel, copper, aluminum and other metals, glass, ceramics, thermosetting resins such as phenolics, urea-formaldehyde and urea-melamine resins, thermosetting plastics such as thermosetting polyesters and crystalline linear polyesters such as polyethylene terephthalate, and the like.

The powdered composition may be deposited on the substrate by use of a powder gun, by electrostatic deposition or by deposition from a fluidized bed or by other well known methods of powder deposition. After deposition the powder is heated to a temperature sufficient to cause its particles to flow and thus fuse together to form a smooth, uniform, continuous, uncratered, adhesive coating on the substrate surface. Since the polyester powder compositions of our invention are amorphous materials, they have no sharp melting point but may be caused to flow within a practical temperature range of 375° F. to 500° F., a preferred temperature for most applications being about 420° F.

The following examples are included for a better understanding of our invention:

EXAMPLE 1

A powdered, heat-fusible polyester coating composition is prepared by adding 95 parts by weight of a pelletized linear polyester prepared in accordance with the process disclosed in U.S. Pat. 2,901,466, having an inherent viscosity of 0.6 and composed of 75 mole percent 1,4-cyclohexanedimethanol and 50 mole percent terephthalic acid and 50 mole percent isophthalic acid; 5 parts by weight of cellulose acetate butyrate in powder form and having a butyryl content of 51% by weight, an acetyl content of 1% by weight, hydroxyl content of 1.5-2% by weight (based on the weight of the cellulose acetate butyrate), a viscosity of 0.2, as determined by ASTM D–817–62T "A" falling ball; 10 parts by weight of di-2-ethylhexyl phthalate; and 0.5 part by weight dilauryl 3,3'-thiodipropionate are homogenized on a two-roll hot mill and withdrawn in sheet form, solidified by cooling, cut into ⅛-inch pellets and finally ground in an attrition mill to a powder having an average particle size of 70 microns. A number of 3 inch by 6 inch 0.037 gauge steel panels are thoroughly cleaned and the powdered polyester composition is deposited thereon electrostaticaly to a depth of about 100 microns. The panels are then heated for 10 minutes at a temperature of 420° F., which causes the powdered particles to flow and coalesce into a coating of excellent appearance. Visual examination of the coated panels show the coated surfaces to be smooth, uncratered and to display only slight orange peel effect. When the coated panels are subjected to the impact test described by Gardner and Sward in Physical and Chemical Examination, Paints, Varnishes, Lacquers, Colors, twelfth edition, p. 146, 1962, the coating is found in each case to have an impact strength greater than 40 inch-pounds.

EXAMPLE 2

A polyester powder mixture is prepared as described in Example 1, except that 90 parts by weight of the polyester component and 10 parts by weight of cellulose acetate butyrate are employed. The powder is applied by electrostatic deposition to clean steel 3 x 6 inch panels to a thickness of .50 microns and heated for 9 minutes at 420° F. Examination of the resulting fused coating reveals a smooth, uncratered film having excellent adhesion to the metal surface, good mar resistance and a high degree of toughness and flexibility.

EXAMPLE 3

A powdered polyester composition containing no cellulose acetate butyrate component is prepared by the general procedure described in Example 1 and applied to 3 x 6 inch 0.037 gauge steel panels by electrostatic deposition. The panels are then heated to a temperature of 420° F. for 8 minutes to produce a fused polyester coating thereon of 125 microns. Examination of the coating reveals numerous small craters, irregular surface and general unevenness of the coating. Because of poor appearance due to cratering such a coating is commercially unacceptable. Thus by comparison, this example illustrates the criticality of the use of the cellulose acetate butyrate component of the compositions of our invention.

EXAMPLE 4

A heat-fusible polyester powder coating composition is prepared in accordance with the general procedure of Example 1, except that 90 parts by weight of the linear polyester, 5 parts by weight of the cellulose ester, 10 parts by weight of di-2-ethylhexyl phthalate, 0.5 part by weight dilauryl 3,3'-thiodipropionate, and 10 parts by weight of a polyester condensation product of bisphenol A-diacetate and terephthalic and isophthalic acids containing 100 mole percent bisphenol A-diacetate, 65 mole percent terephthalic acid and 35 mole percent isophthalic acid is employed in compounding the composition. A powder composed of this material is deposited on a 3 x 6 inch clean 0.037 gauge steel panels by electrostatic deposition to a depth of 100 microns. When the deposited material is heated for a period of 10 minutes at a temperature of 420° F. the particles are found to flow, coalesce and form a smooth, continuous coating on each panel. When the coated panels are subjected to the test described in Example 1, the coatings are found to have excellent substrate adherence, impact strength, toughness, flexibility, mar resistance and to be completely uncratered and otherwise free from surface defects. Such panels are immersed in water for 14 days, removed and examined. In attempting to strip the coating from the panel with a sharp knife, it is found that the coating firmly adheres to it even after the 14 day immersion in water.

EXAMPLE 5

The exact procedure of Example 1 is followed except the dalauryl 3,3'-thiodipropionate is omitted. While the resulting coating is smooth, uncratered and displays only slight orange peel effect, it is discolored.

It will be evident from the foregoing description and examples that the present invention provides a simple and effective means of coating a wide variety of metal, glass, ceramic, heat-hardening plastic and other substrates by the employment of heat-fusible polyester powder compositions at relatively low application temperatures (e.g., 420° F.). The coatings are strongly adherent to the substrate surface, are tough, flexible, have high impact strength and are free from cratering and other surface defects. Powder compositions of the invention which contain the condensation product of bisphenol A-diacetate with terephthalic and isophthalic acids are also characterized by an extremely high degree of substrate adherence, high impact strength, toughness, and freedom from loss of adherence. The polyester coating powders of our invention are particularly advantageous in that no primer coat is required in order to obtain adequate adhesion of the composition to the surface to be coated. Such compositions are also susceptible to ready application to any surface by means of standard powder coating techniques as for example gun spraying, electrostatic deposition and deposition by the fluidized bed method. Many other advantages will be apparent to those skilled in the art.

Although the invention has been described in considerable detail with reference to certain preferred embodiments thereof, it will be understood that variations and modifications can be effected without departing from the spirit and scope of the invention as described hereinabove.

We claim:
1. Composition comprising:
   (1) from about 72 to about 98 parts by weight, based on said composition, of a linear polyester having an inherent viscosity determined at 25° C. in 60/40 parts by weight of phenol/tetrachloroethane at a concentration of 0.25 gram/100 milliliters of at least about 0.4 essentially derived from constituents:
      (a) a dibasic dicarboxylic acid comprising 45–55 mole percent terephthalic acid and 55–45 mole percent isophthalic acid, or polyester forming derivatives thereof, and
      (b) a glycol comprising at least 75 mole percent 1,4-cyclohexanedimethanol or polyester forming derivatives thereof, and
   (2) from about 2 to about 28 parts by weight of said composition of a cellulose ester wherein the cellulose ester contains acetate and butyrate groups, said cellulose ester having a butyryl content of at least 15 percent by weight of said cellulose ester, an acetyl content of from about 0.5 percent to about 34 percent by weight of said cellulose ester, a hydroxy content of from about 0.1 percent to about 5 percent by weight of said cellulose ester and a viscosity of from about 0.1 to about 30 determined by ASTM Procedure Designation D–817.

2. Composition of claim 1 also comprising from about 2 to about 20 parts by weight, based on said composition, of a plasticizing ester of an organic acid and an alcohol having plasticizing properties in conjunction with said cellulose ester and said polyester.

3. Composition of claim 1 also comprising from about 2 to about 30 parts by weight of a pigment, a dye, or a combination thereof.

4. Composition of claim 2 also comprising from about 2 to about 30 parts by weight of a pigment, a dye, or a combination thereof.

5. Composition of claim 1 also comprising from about 1 to about 10 parts by weight of a linear bisphenolic polyester having an inherent viscosity determined at 25° C. in 60/40 parts by weight phenol/tetrachloroethane at a concentration of 0.25 gram/100 milliliters of from about 0.1 to about 0.3 essentially derived from constituents:
   (a) a dicarboxylic acid comprising 55–75 mole percent terephthalic acid and 25–45 mole percent isophthalic acid or ester forming derivatives thereof, and
   (b) 45 to 25 mole percent 4,4'-isopropylidenediphenol.

6. Composition of claim 2 also comprising from about 1 to about 10 parts by weight of a linear bisphenolic polyester having an inherent viscosity determined at 25° C. in 60/40 parts by weight phenol/tetrachloroethane at a concentration of 0.25 gram/100 milliliters of from about 0.1 to about 0.3 essentially derived from constituents:
  (a) a dicarboxylic acid comprising 55–75 mole percent terephthalic acid and 25–45 mole percent isophthalic acid or ester forming derivatives thereof, and
  (b) 45 to 25 mole percent 4,4′-isopropylidenediphenol.

7. Composition of claim 1 which also comprises from about 1 percent based on the weight of said linear polyester of a stabilizer for said linear polyester.

8. Composition of claim 3 also comprising from about 0 to about 1 percent based on the weight of said linear polyester of a stabilizer for said linear polyester.

9. Composition of claim 1 wherein said linear polyester is poly(1,4-cyclohexanedimethylene-50 mole percent terephthalate-50 mole percent isophthalate) and said cellulose ester has a butyryl content of about 51 percent by weight, an acetyl content of about 1.5–2.0 percent by weight and a viscosity of about 0.2.

10. Composition of claim 9 comprising about 95 parts by weight of said linear polyester, and about 5 parts by weight of said cellulose ester.

11. Composition of claim 10 also comprising about 10 parts by weight of di-2-ethylhexyl phthalate.

12. Composition of claim 5 wherein said linear polyester is poly(1,4-cyclohexanedimethylene-50 mole percent terephthalate-50 mole percent isophthalate), said cellulose ester has a butyryl content of about 51 percent by weight, an acetyl content of about 1.5–2.0 percent by weight, and a viscosity of about 0.2.

13. Composition of claim 12 comprising about 90 parts by weight of said linear polyester, about 5 parts by weight of said cellulose ester, and about 10 parts by weight of said linear bisphenolic polyester.

14. Composition of claim 13 also comprising about 10 parts by weight of di-2-ethylhexyl phthalate.

15. Composition according to claim 10 also comprising about 0.5 part by weight dilauryl 3,3′-thiodipropionate.

16. Composition according to claim 13 also comprising about 0.5 part by weight dilauryl 3,3′-thiodipropionate.

17. Composition of claim 1 adhered to a metal, glass, ceramic, or plastic substrate.

18. Composition of claim 5 adhered to a metal, glass, ceramic, or plastic substrate.

19. Composition of claim 9 adhered to a metal, glass, ceramic or plastic substrate.

20. Composition of claim 10 adhered to a metal, glass, ceramic or plastic substrate.

21. Composition of claim 12 adhered to a metal, glass, ceramic or plastic substrate.

22. Composition of claim 13 adhered to a metal, glass, ceramic or plastic substrate.

References Cited

UNITED STATES PATENTS

| | | | |
|---|---|---|---|
| 2,901,466 | 8/1959 | Kibler et al. | 260—75 |
| 2,965,613 | 12/1960 | Milone et al. | 260—75 |
| 3,049,506 | 8/1962 | Kibler et al. | 260—16 |

HAROLD D. ANDERSON, Primary Examiner

E. WOODBERRY, Assistant Examiner

U.S. Cl. X.R.

117—124 E, 132 B, 138.8 A, 161 C; 260—31.2

PO-1050
(5/69)

UNITED STATES PATENT OFFICE
CERTIFICATE OF CORRECTION

Patent No. 3,654,198      Dated April 4, 1972

Inventor(s) James D. Hood and James G. Stranch

It is certified that error appears in the above-identified patent and that said Letters Patent are hereby corrected as shown below:

Column 1, lines 59-72, should be deleted.

Column 2, lines 1-20 should be deleted.

Column 2, line 25, delete "standard deposition method sand then fused by applica-" and insert therefor ---standard powder deposition methods and then fused by applica- ---.

Column 3, line 51, "A-diacetic" should be ---A-diacetate---.

Signed and sealed this 19th day of September 1972.

(SEAL)
Attest:

EDWARD M. FLETCHER, JR.
Attesting Officer

ROBERT GOTTSCHALK
Commissioner of Patents